United States Patent
Tava (10) Patent No.: US 10,768,005 B2
(45) Date of Patent: Sep. 8, 2020

(54) SYSTEM AND METHOD FOR NAVIGATING A VEHICLE, AND VEHICLE

(71) Applicant: Bayerische Motoren Werke Aktiengesellschaft, Munich (DE)

(72) Inventor: Marcello Tava, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 71 days.

(21) Appl. No.: 16/131,765

(22) Filed: Sep. 14, 2018

(65) Prior Publication Data

US 2019/0011276 A1 Jan. 10, 2019

Related U.S. Application Data

(63) Continuation of application No. PCT/EP2017/053823, filed on Feb. 21, 2017.

(30) Foreign Application Priority Data

Mar. 16, 2016 (DE) .......................... 10 2016 204 377

(51) Int. Cl.
*G01C 21/34* (2006.01)
*G08G 1/0968* (2006.01)
(Continued)

(52) U.S. Cl.
CPC ..... *G01C 21/3492* (2013.01); *G01C 21/3461* (2013.01); *G07C 5/008* (2013.01);
(Continued)

(58) Field of Classification Search
CPC ............ G01C 21/3492; G01C 21/3461; G07C 5/008; G08G 1/0112; G08G 1/0141; G08G 1/096827
(Continued)

(56) References Cited

U.S. PATENT DOCUMENTS

2005/0251327 A1 11/2005 Ogasawara et al.

FOREIGN PATENT DOCUMENTS

DE    10 2005 013 556 A1    10/2005
JP    2004-053492 A    *    2/2004
(Continued)

OTHER PUBLICATIONS

International Search Report (PCT/ISA/210) issued in PCT Application No. PCT/EP2017/053823 dated May 30, 2017 with English translation (five pages).
(Continued)

*Primary Examiner* — Brian P Sweeney
(74) *Attorney, Agent, or Firm* — Crowell & Moring LLP (57) ABSTRACT

A system and method for navigating a vehicle includes a management unit (server) arranged outside of the vehicle for centrally storing traffic information and traffic rules relating to vehicle information. The traffic rules relate, for example, to road closures and restrictions based on vehicle type. A detection unit has an interface for detecting vehicle information of the vehicle, such as at least one vehicle identification number, and is designed to transmit the detected vehicle information of the vehicle to the managing unit. A computing module generates navigation information based on traffic rules stored on the managing unit and vehicle information. The generated navigation information is output in the vehicle by a navigation unit (client).

18 Claims, 2 Drawing Sheets

(51) Int. Cl.
 G08G 1/01 (2006.01)
 G07G 5/00 (2006.01)
 G07C 5/00 (2006.01)
(52) U.S. Cl.
 CPC ......... *G08G 1/0112* (2013.01); *G08G 1/0141* (2013.01); *G08G 1/096827* (2013.01)
(58) Field of Classification Search
 USPC .......................................................... 701/423
 See application file for complete search history.

(56) References Cited

FOREIGN PATENT DOCUMENTS

JP         2004-53492 A      2/2004
WO    WO 2015/024126 A1    2/2015

OTHER PUBLICATIONS

German-language Written Opinion (PCT/ISA/237) issued in PCT Application No. PCT/EP2017/053823 dated May 30, 2017 (eight pages).
German-language Search Report issued in counterpart German Application No. 10 2016 204 377.3 dated Jan. 31, 2017 with partial English translation (14 pages).

* cited by examiner

SYSTEM AND METHOD FOR NAVIGATING A VEHICLE, AND VEHICLE

CROSS REFERENCE TO RELATED APPLICATIONS

This application is a continuation of PCT International Application No. PCT/EP2017/053823, filed Feb. 21, 2017, which claims priority under 35 U.S.C. § 119 from German Patent Application No. 10 2016 204 377.3, filed Mar. 16, 2016, the entire disclosures of which are herein expressly incorporated by reference.

BACKGROUND AND SUMMARY OF THE INVENTION

The present invention relates to a system and a method for navigating a vehicle and to a vehicle equipped with this system.

In order to facilitate the use of vehicles for vehicle users, navigation appliances, i.e. navigation units, are in widespread use. These navigation appliances take away route planning from the vehicle user by computing the shortest, fastest or most convenient route, on the basis of a stored road network, based on the current location of the vehicle equipped with the navigation appliance and the stipulated destination and, in some cases, optionally entered route points (points of interest, POI) and displaying said route to the vehicle user. In particular, traffic rules referring to the road network, for example traveling along one-way streets in only one direction, crossing a roundabout anticlockwise, etc., are also included in the route planning.

Further functions of such navigation appliances are based on the inclusion of realtime information, for example pertaining to the road network or the traffic situation, accessible to the navigation appliance by radio, for example by means of a traffic information service (realtime traffic information, RTTI). If a queue is identified on the route planned by the navigation appliance, for example, then it is possible to look for a new route that bypasses the queue and is therefore faster. Similarly, in the case of a road closure for a road intended to be used according to the planned route, it is possible for alternative routing that bypasses the closed road to be planned. Furthermore, the vehicle user can also be made aware of particular hazards on the planned route, e.g. as a result of black ice, by means of such functions of a navigation appliance.

It is an object of the invention to improve the route planning by a navigation system that, during route planning, takes into consideration vehicle information of the vehicle using the navigation system in the route planning by virtue of traffic rules referring to vehicle information also being included in the route planning. In particular, this is intended to make the use of a system for navigation that has a navigation appliance, i.e. a navigation unit, more convenient and safer.

The system according to the invention for navigating a vehicle according to a first aspect of the invention has an external management unit for storing vehicle information and traffic rules referring to vehicle information, wherein the traffic rules relate in particular to the closure of roads, and a capture unit that has an interface for capturing vehicle information of the vehicle containing at least one vehicle identification number and that is configured to send the captured vehicle information of the vehicle to the management unit. Preferably, the system additionally has a computation module for computing navigation information, configured to also include traffic rules stored on the management unit and referring to vehicle information of the vehicle in the computation of the navigation information, and a navigation unit in the vehicle for outputting navigation information computed by the computation module.

The method according to the invention for navigating a vehicle according to a second aspect of the invention has the following work steps: capturing vehicle information of the vehicle, in particular a vehicle identification number, by means of a capture unit; sending the captured vehicle information of the vehicle to a management unit on which traffic rules referring to vehicle information are stored; storing the captured vehicle information of the vehicle on the management unit; computing navigation information by means of a computation module by taking into consideration the traffic rules stored on the management unit and referring to vehicle information of the vehicle; and outputting the navigation information computed by the computation module by means of a navigation unit in the vehicle.

The vehicle, in particular motor vehicle, according to the invention has a navigation system according to the invention.

A management unit within the context of the invention is an apparatus for filing, in particular storing, and organizing, in particular reading, copying, moving, searching through and/or erasing, information, in particular vehicle information and traffic rules referring to vehicle information. The information is in this case preferably organized and/or linked in a database. The management unit is configured to allow access to the filed information or to send the filed information on request, preferably via a network, in particular the Internet. The management unit is in particular configured as a server or computer center.

A capture unit within the context of the invention is an apparatus for recording, i.e. capturing, information, in particular vehicle information of a vehicle. Preferably, the recording in this case is performed manually or semimanually by the user. The capture unit is in this case configured in particular as an Internet portal, accessible from any computer with an Internet connection, or as a component of a navigation appliance having a user interface. In particular, the user enters the vehicle information of the vehicle in this regard in accordance with an input mask of the Internet portal or of the user interface. Preferably, the capture unit is configured as a camera, so that the vehicle information or at least some of the vehicle information can be recorded visually and, in a preferred configuration, read digitally. More preferably, the recording is performed automatically, in particular if the capture unit is configured as a module of a navigation appliance or of a vehicle and has direct access to vehicle information of the vehicle that is stored in particular in a memory of the vehicle. Alternatively or additionally, the capture unit is configured to capture the vehicle information wirelessly, in particular by means of radio signals, in particular if the vehicle information is filed on integrated circuits, provided in or on the vehicle, in particular in the license plate of the vehicle, that are configured to store and wirelessly send the vehicle information.

A computation module within the context of the invention is an apparatus for computing and/or planning a route based on fundamental inputs by a user. Such fundamental inputs relate in particular to destination, intermediate destinations and/or planning parameters, for example exclusion of a type of road such as freeway or country road, bypassing of villages, distance minimization, time minimization and the like. Furthermore, the computation module needs to be provided with the current location of the vehicle for which the route is intended to be computed, in particular by means of a system for satellite navigation. On the basis of this information, the computation module can compute a route optimized in respect of the planning parameters based on a map of the road network that is available to the computation module, in particular as a result of being filed in a memory. The map of the road network is preferably kept up to date by means of updates.

A navigation unit within the context of the invention is an apparatus for outputting navigation information, i.e. route information of a planned and/or computed route, in a vehicle. The output is implemented in particular by display on a display apparatus, for example a display, or by means of audible instructions that pilot or guide the vehicle user along the computed route. Preferably, the navigation unit is a modular piece of equipment of a vehicle, i.e. simple installation and/or removal is possible. In particular, simple changing from one vehicle to another vehicle is possible, which means that the navigation unit can be used flexibly. More preferably, the navigation unit is permanently integrated in a vehicle, so that it can particularly easily access data in a memory of the vehicle that stores in particular vehicle information, for example engine specifications and/or vehicle registration number.

The invention is based on the approach of filing the vehicle information of a vehicle, for example vehicle registration number and/or engine specification and/or vehicle length and/or width and/or vehicle weight and/or exhaust emissions and/or fuel consumption, etc., on an external management unit, for example a server or a computer center. At the same time, this management unit contains traffic rules or has access to traffic rules relating to vehicle information, i.e. valid only for vehicles that have particular features contained in the vehicle information. The combination of vehicle information and traffic rules referring to vehicle information allows navigation information to be computed, i.e. a route to be planned, that also includes, i.e. takes into consideration, the traffic rules referring to vehicle information of the vehicle. This navigation information is output by a navigation appliance in the vehicle, for example displayed on a display and/or rendered accessible by audible signal.

Such traffic rules referring to vehicle information can comprise, by way of example, the closure of roads for particular vehicle registration numbers at particular times in order to regulate the volume of traffic on particular routes. Such regulation is advantageous particularly in built-up areas with a high density of vehicles. Accordingly, by way of example, vehicles having uneven vehicle registration numbers are not permitted to use a particular road on uneven days such as March $1^{st}$, March $3^{rd}$, etc., while vehicles having even registration numbers are not permitted to use this particular road on even days such as March $2^{nd}$, March $4^{th}$, etc. According to another exemplary traffic rule referring to vehicle information, automobiles having exhaust emissions above a stipulated limit are not permitted to use a particular road at particular times of day. In an advantageous embodiment of the invention, such closed roads are graphically marked or indicated on the display of the navigation unit and not taken into consideration in, or excluded from, route planning. In particular, the roads closed on the basis of traffic rules referring to vehicle information may be marked or indicated differently than closed roads that are closed to every road user, i.e. independently of traffic rules referring to vehicle information.

Since such traffic rules referring to vehicle information may be complex and may possibly change frequently, it is therefore advantageous, in a navigation system that also includes such traffic rules referring to vehicle information in the route planning, i.e. the computation of navigation information, to file these traffic rules referring to vehicle information centrally on the management unit, since they can be changed or updated easily and directly there and are available to all users of the navigation system, for example via a communication link, without said users needing to perform an update on their navigation unit in the vehicle.

The invention in particular allows the navigation information on the same starting point to the same destination to turn out differently for different users of the navigation system, i.e. different navigation units output different navigation information in this case, or the navigation information turns out differently for the same user from the same starting point to the same destination at different times.

Overall, the invention allows navigation of a vehicle by taking into consideration traffic rules referring to vehicle information in a simple and reliable manner.

In an advantageous configuration of the system according to the first aspect of the invention, the navigation unit has an interface configured to capture and store the vehicle identification number. This allows the navigation unit to be particularly easily and reliably associated with the vehicle and the traffic rules referring to the vehicle information of the vehicle.

In a further advantageous configuration of the system according to the first aspect of the invention, the navigation unit is configured to set up a communication link to the management unit and in so doing to transmit at least the stored vehicle identification number for identifying the vehicle by means of the management unit. In particular, the navigation unit can set up a wireless communication link to the management unit, for example using a radio standard such as UMTS, HSPA or LTE. This associates the navigation unit with the vehicle and the traffic rules referring to the vehicle information of the vehicle even more easily and reliably.

In a further advantageous configuration of the system according to the first aspect of the invention, the management unit has the computation module, wherein the navigation unit is configured to receive the navigation information computed by the computation module by including the traffic rules referring to vehicle information of the vehicle. This keeps down the demands on the computation power of the navigation appliance, so that inexpensive manufacture is possible. At the same time, it is possible to design the computation module of the management unit in complex fashion and to ensure a high computation power. Therefore, the navigation information to be computed can be computed particularly efficiently and quickly by including traffic rules referring to vehicle information. Central updates of the traffic rules referring to vehicle information, which updates need only be performed once, ensure particularly reliable navigation for a vehicle by including traffic rules referring to vehicle information of the vehicle.

In a further advantageous configuration of the system according to the first aspect of the invention, the navigation unit has the computation module and is configured to receive the traffic rules stored by the management unit and referring to vehicle information of the vehicle. This keeps down the data traffic via the communication link between navigation unit and management unit as far as possible, since only single roads affected by traffic rules referring to vehicle information of the vehicle, and the applicable traffic rules, need to be sent to the navigation appliance.

In a further advantageous configuration of the system according to the first aspect of the invention, the capture unit is configured to capture a vehicle registration number as vehicle identification number or to capture a vehicle registration number as vehicle information besides the vehicle identification number. This allows in particular traffic rules referring to the vehicle registration number of a vehicle to be taken into consideration for computing the navigation information. Furthermore, it is a particularly simple matter for the management unit, using the vehicle registration number as vehicle identification number, to identify a particular vehicle in order to assign it the applicable traffic rules referring to the vehicle.

In a further advantageous configuration of the system according to the first aspect of the invention, the capture unit is configured to capture at least one engine specification as vehicle information besides the vehicle identification number. This allows in particular traffic rules referring to engine specifications of a vehicle to be taken into consideration for computing the navigation information.

In a further advantageous configuration of the system according to the first aspect of the invention, the interface of the input unit is configured as an input mask of an Internet portal. This is convenient for the vehicle user, since he can enter and/or change the vehicle information of the vehicle at any time at any location.

In a further advantageous configuration of the system according to the first aspect of the invention, the navigation unit has a capture unit. This allows the vehicle user to have the vehicle information captured via the interface directly at the navigation unit in the vehicle. This is done by entering the vehicle information into the capture unit, in particular a user interface, or by reading the vehicle information by means of the capture unit, in particular a camera. Alternatively or additionally, the interface of the capture unit is configured as a reception module that can receive vehicle information wirelessly, in particular by means of a radio signal. This is particularly advantageous if the vehicle information is present on an integrated circuit, in particular a microchip, provided on or in the vehicle, in particular in the license plate of the vehicle, and configured to send the vehicle information to the capture unit by means of a radio signal. This preferred embodiment is particularly convenient for the vehicle user and, moreover, particularly reliable.

The features and advantages described for a system according to the first aspect of the invention apply to a method according to the second aspect of the invention accordingly, and vice versa.

In a preferred configuration of the method for navigating a vehicle, the navigation unit in the vehicle sends to the management unit a request signal to compute and send navigation information that takes into consideration traffic rules referring to vehicle information of the vehicle, whereupon the computation module of the management unit computes the navigation information by taking into consideration the traffic rules referring to vehicle information of the vehicle and sends said navigation information to the navigation unit. This keeps down the demands on the computation power of the navigation appliance, so that inexpensive manufacture is possible. At the same time, it is possible to design the computation module of the management unit in complex fashion and to ensure a high computation power, in particular by means of central updates that need only be performed once. Therefore, the navigation information to be computed can be computed particularly efficiently and quickly by including traffic rules referring to vehicle information.

In a further configuration of the method for navigating a vehicle, the navigation unit in the vehicle sends to the management unit a request for the management unit to send traffic rules stored on the management unit and referring to vehicle information of the vehicle, whereupon the management unit sends traffic rules referring to vehicle information of the vehicle to the navigation unit and the computation module of the navigation unit computes the navigation information by taking into consideration the received traffic rules referring to vehicle information of the vehicle. This keeps down the data traffic between navigation unit and management unit as far as possible, since only single roads affected by traffic rules referring to vehicle information of the vehicle, and the applicable traffic rules, need to be sent to the navigation appliance.

In a further preferred configuration of the method for navigating a vehicle, the navigation unit sends the identification number of the vehicle together with the request. The management unit identifies the traffic rules referring to vehicle information of the vehicle on the basis of the vehicle identification number and then sends said traffic rules to the navigation unit or takes them into consideration to compute navigation information by means of the computation module and subsequently sends said navigation information to the navigation unit.

In a further preferred configuration of the method, current traffic rules referring to vehicle information are stored on the management unit.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
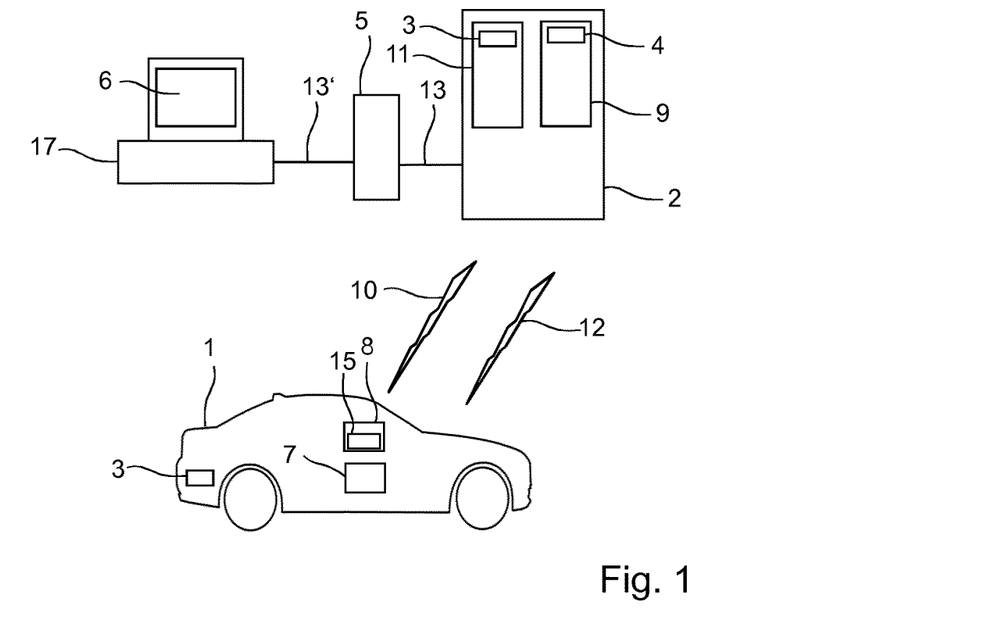
FIG. 1 shows a first embodiment of a system for navigating a vehicle in accordance with an embodiment of the present invention.
Figure 4:
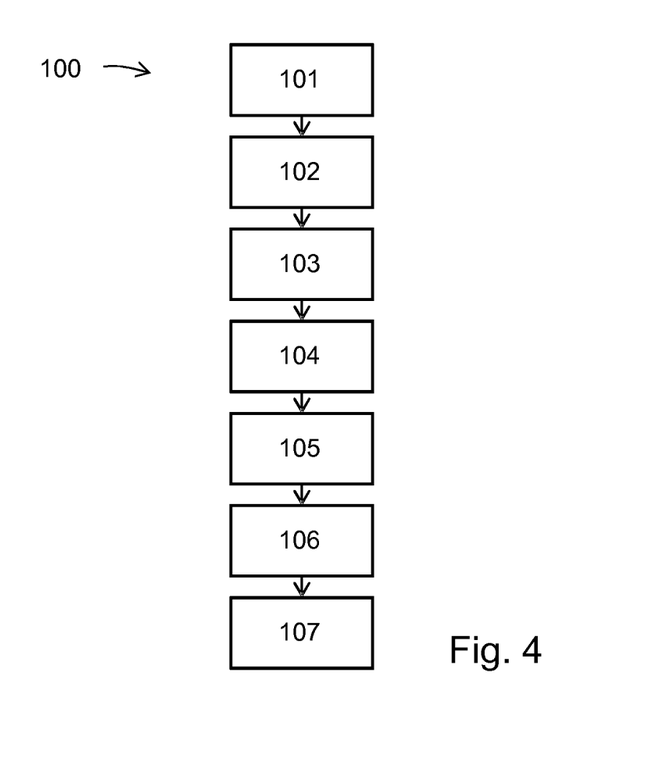
FIG. 4 shows a first embodiment of a method for navigating a vehicle in accordance with an embodiment of the present invention.

FIG. 1 shows a first embodiment for navigating a vehicle 1. The vehicle 1 has a computation module 7 that can in particular compute navigation information in a method step 106. For this purpose, navigation data are initially transmitted to the computation module 7, in particular location of the vehicle 1, destination, preferred types of road such as freeway, country road, etc., and the preferred navigation mode of the user, such as fastest route, shortest route, prettiest route, etc. These navigation data are preferably entered via an interface 15. Preferably, the interface 15 is part of a navigation unit 8 configured to transmit the navigation data to the computation module 7. Preferably, the navigation unit 8 is configured to ascertain the location of the vehicle 1, for example by satellite navigation. The computation module 7 further has a map of the road network available, on the basis of which the navigation information can be computed in method step 106. The computed navigation information is preferably transmitted to the navigation unit 8 and output by the navigation unit 8 in method step 107, in particular visually as instructions on a display unit and/or audibly.

The computation module 7 is configured to also include traffic rules 4 referring to vehicle information 3 of the vehicle 1 in the computation of the navigation information in addition to the navigation data in method step 106. These traffic rules 4 can relate in particular to the closure and/or speed limits of selected roads for vehicles having particular vehicle registration numbers and/or engine specifications and/or vehicle dimensions and/or vehicle weight and/or exhaust emissions and/or fuel consumption. In particular, these traffic rules 4 can have a limited validity period, i.e. may in particular be valid only on selected days such as weekends, holidays, even or uneven calendar weeks, even or uneven days of the month, at rush hour, etc. More preferably, the traffic rules 4 can relate to vehicles having particular registration number features, for example vehicles having an even or uneven registration number or vehicles having a registration number whose digits form a number that is greater or less than a defined limit value or part of a group of numbers.

Preferably, the computation module 7 is also part of the navigation unit 8.

The traffic rules 4 referring to vehicle information 3 of the vehicle 1 are filed on a management unit 2 in a traffic rule memory 9 provided for that purpose. The management unit 2 is preferably situated outside the vehicle 1. In particular, the management unit 2 is local. Preferably, the management unit 2 is configured as a server or computer center. To gain access to the traffic rules 4 referring to vehicle information 3 of the vehicle 1, the vehicle 1 or the navigation unit 8 sends a request signal 10, in particular via a wireless connection such as GSM, UMTS or LTE, or a wireless Internet connection using one of these radio standards, to the management unit 2 in method step 104. The request signal 10 contains vehicle information 3 of the vehicle 1, in particular a vehicle identification number, by means of which the request signal 10 or vehicle information 3 can be associated with the vehicle 1. Preferably, the vehicle identification number to be transmitted with the request signal 10 is stored on the navigation unit 8.

The management unit 2 files the vehicle information 3 of the vehicle 1 in a vehicle information memory 11 provided for that purpose. Using the vehicle information 3 of the vehicle 1 that is sent with the request signal 10, in particular using the vehicle identification number, it is possible for the vehicle information 3 filed in the vehicle information memory 11 to be associated with the vehicle 1 sending the request signal 10.

Vehicle information 3 and traffic rules 4 referring to vehicle information 3 that are stored in the vehicle information memory 11 and in the traffic rule memory 9 are preferably linked to one another in the management unit 3, in particular in the form of a database. In particular, all traffic rules 4 referring to vehicle information 3 are associated with the vehicle information 3 filed in the vehicle information memory 11. The management unit 2 is preferably configured to identify and make available, in method step 105, all traffic rules 4 relating specifically to this vehicle information 3 for a particular piece of vehicle information 3 filed in the vehicle information memory 11. In particular, all traffic rules 4 that relate to a particular registration number and/or engine specification and/or vehicle dimensions and/or vehicle weight and/or exhaust emissions and/or fuel consumption can be identified and made available. Alternatively or additionally, all traffic rules 4 that relate to a particular group of registration numbers and/or engine specifications and/or vehicle dimensions and/or vehicle weights and/or exhaust emissions and/or fuel consumptions can be identified and made available.

In response to the request signal 10, the management unit 2 looks for the vehicle information 3 of the vehicle 1 sending the request signal 10 in the vehicle information memory 11, in particular on the basis of the vehicle identification number contained in the request signal 10. On the basis of this vehicle information 3, the management unit 2 identifies, i.e. searches for or gathers or extracts or finds, all traffic rules 4 relating to this vehicle information 3 in method step 105 and sends said traffic rules to the vehicle 1 or the navigation unit 7 in a response signal 12. As a result, the traffic rules 3 referring to the vehicle information 3 of the vehicle 1 are available to the computation module 7 in the vehicle 1, in particular as part of the navigation unit 8, for computing the navigation information. In particular, the computation module 7 can now also include all traffic rules 4 that the vehicle 1 or the driver thereof needs to observe on the basis of the vehicle information 3, i.e. nature or properties, of the vehicle 1 in the computation of the navigation information, i.e. the route planning, in the method step 106.

As a result, in particular roads that the vehicle 1 is not permitted to use are not also included in the route planning, i.e. the computation of the navigation information, and, preferably when the navigation information is output in method step 107, marked by the navigation unit 8, for example in color by means of a red edge or by means of a grayed-out depiction, in particular for the display of the navigation information, or by hatching or crosses. In particular, the roads that the vehicle 1 is not permitted to use specifically on the basis of its special vehicle information 3 are marked in a different manner than roads that are closed to all vehicles regardless of their respective vehicle information.

The storage of the traffic rules 4 referring to vehicle information 3 in the traffic rule memory 9 on the management unit 2 allows the traffic rules 4 referring to vehicle information 3 to be updated, i.e. kept up to date, particularly easily. In the event of a change to the traffic rules 4 referring to vehicle information 3, in particular on account of amended legal requirements or as a result of requirements by the road operator, the accordingly updated traffic rules 4 on the management unit 2 are available to the computation modules 7 immediately. It is in particular not necessary to perform updates on the computation modules 7 in every single vehicle 1 if these computation modules 7 can communicate with the management unit 2, in particular via the navigation unit 8, i.e. are part of the system for navigating a vehicle 1.

To make the vehicle information 3 of a vehicle 1 available to the management unit for filing in the vehicle information memory 11 and for linking to traffic rules 4 referring to this vehicle information 3, the system for navigating a vehicle 1 has a capture unit 5. The capture unit 5 is configured to capture the vehicle information 3 of a vehicle 1, in particular at least one vehicle identification number, in method step 101 and to make said vehicle information available to the management unit 2 in method step 102. The capture unit 5 may be configured as a server, in particular a computer center, so that the captured vehicle information 3 can be transmitted to the management unit 2 via a first interconnect connection 13.

The capture unit 5 has an interface 6 by which the vehicle information 3 can be captured in method step 101. In the depicted first embodiment, this is an Internet portal into which a user can enter the vehicle information 3. The user can use the Internet portal via a second Internet connection 13', in particular of a device 17 having Internet capability, for example of a home computer or a smartphone.

Preferably, the transmission of the vehicle information 3 to the management unit 2 via the first Internet connection 13 in method step 102 involves a vehicle identification number being produced and displayed or made available to the user, in particular in the form of a file, by which the vehicle information 3 can be identified and associated with the vehicle 1. More preferably, the identification number is the registration number of the vehicle 1. This allows the vehicle information 3, which preferably contains the registration number of the vehicle 1, to be identified and associated with the vehicle 1 particularly easily.

The vehicle identification number also needs to be filed, i.e. stored, in the navigation unit 8 so that identification of the vehicle 1 or the association of the request signal 10 with the vehicle 1 can be performed by the management unit 2. In this regard, the user can enter the vehicle identification number preferably via the interface 15 of the navigation unit 8, which transmits the vehicle identification number to the computation module 7, or makes it available to the computation module 7, which is preferably part of the navigation unit 8. The interface 15 of the navigation appliance 8 may in particular be configured as a touch-sensitive display, physical drive or radio receiver. In this manner, it is possible for entry of the vehicle identification number to be performed, in particular by entry, insertion of a storage medium on which the vehicle identification number is filed or by means of a radio signal that is in particular sent from a device 17 having Internet capability, in particular a smartphone or portable computer of the user, to the navigation appliance 8 or the interface 15.

Figure 2:
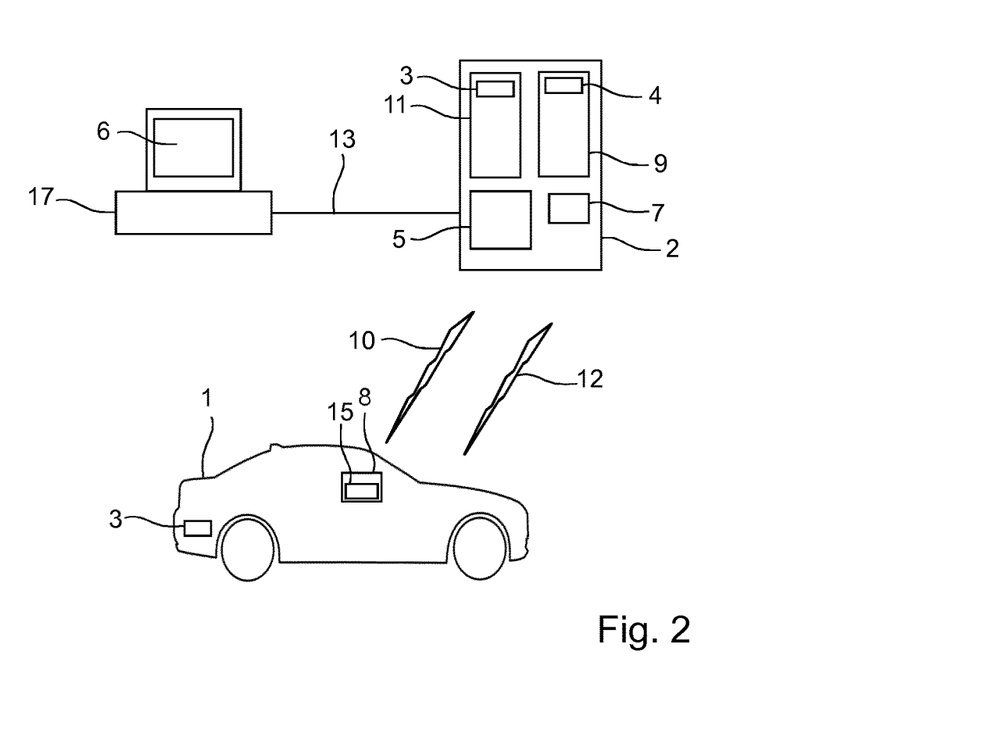
FIG. 2 shows a second embodiment of a system for navigating a vehicle in accordance with an embodiment of the present invention.

FIG. 2 shows a second embodiment of a system for navigating a vehicle 1. The management unit 2 has, in addition to the traffic rule memory 9 and the vehicle information memory 11, a capture unit 5 for capturing vehicle information 3 in method step 101 and a computation module 7 for computing navigation information in method step 106. The management unit 2 configured as a server or computer center captures vehicle information 3 entered by a user via an interface 6, in particular an Internet portal, particularly efficiently in this case. The user in this case has access to the Internet portal, in particular of a home computer or a smartphone, via a first Internet connection 13 of any device 17 having Internet capability.

The computation module 7 computes the navigation information by taking into consideration traffic rules 4 referring to vehicle information 3 directly in the management unit 2 in method step 106. As a result, the computation module 7 particularly easily and reliably has access to vehicle information 3 and traffic rules 4 referring to vehicle information 3 that are filed in the vehicle information memory 11 and traffic rule memory 9. The computation of navigation information by the computation module 7 in method step 106 takes place at the request of the navigation unit 8 in the vehicle 1 in method step 104. In this regard, the vehicle 1 or the navigation unit 8 sends a request signal 10 to the management unit 2 or the computation module 7 in the management unit 2. The request signal 10 in this case contains, besides the vehicle identification number for associating the request with the vehicle 1, all navigation data necessary for computing the navigation information, in particular location of the vehicle 1, destination, route preferences of the driver, etc. The navigation information computed by the computation module 7 in method step 106 by including the navigation data and traffic rules 4 referring to vehicle information 3 is sent in the form of a response signal 12 to the vehicle 1 or the navigation unit 8 and output by the navigation unit 8 in method step 107. The traffic rules 4 used for the computation in method step 106 are valid in this case for vehicles that have features consistent with the vehicle information 3 of the vehicle 1 that is filed in the vehicle information memory 11 and identified by the vehicle identification number contained in the request signal 10. This relates the navigation information to the vehicle 1 or navigation unit sending the request and provided in the vehicle 1 to be navigated, i.e. said navigation information is valid specifically for this vehicle 1.

Preferably, the management unit 2 produces the vehicle identification number by means of which the vehicle information 3 in the vehicle information memory 11 can be associated with the request signal 10 when filing the vehicle information 3 in the vehicle information memory 11 in method step 103. Particularly advantageously, the vehicle identification number is the registration number of the vehicle 1. The vehicle identification number is, analogously to the first embodiment, transmitted to the user, in particular displayed on his device 17 having Internet capability or stored in a file, so that the user can transmit, in particular enter, the vehicle identification number to or on his vehicle 1 or the navigation unit 8 in his vehicle 1. Preferably, the interface 15 of the navigation appliance 8 can be used for this purpose, which may be configured as one of the embodiments described in the description of FIG. 1.

Figure 3:
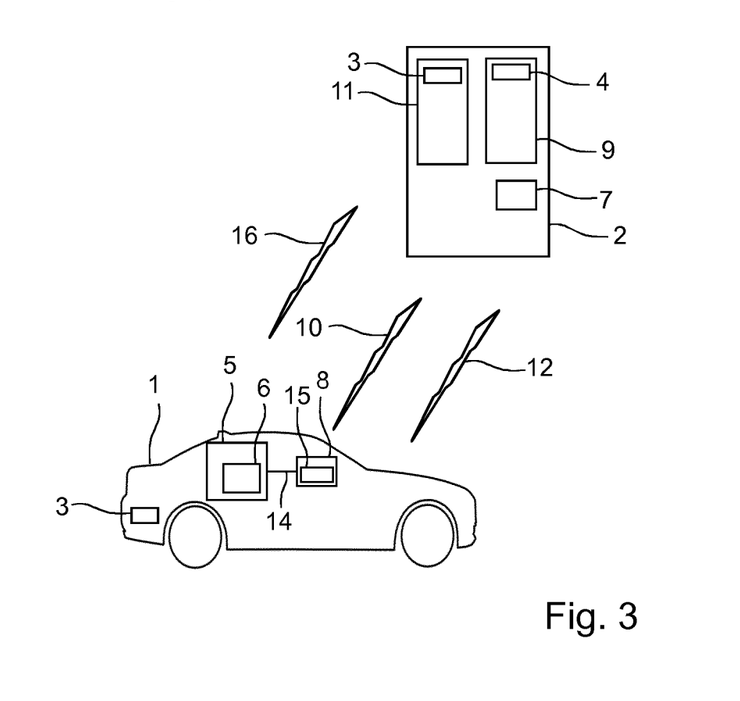
FIG. 3 shows a third embodiment of a system for navigating a vehicle in accordance with an embodiment of the present invention.

FIG. 3 shows a third embodiment of a system for navigating a vehicle 1. The computation module 7 in this case is associated with the management unit 2 or is part of the management unit 2. The computation module 7 is in particular situated outside the vehicle 1. The capture unit 5 is associated with the vehicle 1 and connected to the navigation unit 8 via a connection 14. Preferably, the capture unit 5 is part of the navigation unit 8. In particular, the navigation unit 8 has a capture unit 5.

The capture unit 5 captures the vehicle information 3 relating to the vehicle 1 directly on or in the vehicle 1 via the interface 6 in the method step 101. Particularly preferably, the interface 6 is consistent with the interface 15 of the navigation unit 8, which in particular is configured as a touch-sensitive display or a voice recognition module. More preferably, the interface 6 is a radio receiver by which a portable computer or a smartphone of the user that transmits the captured, i.e. entered, vehicle information 3 to the capture unit 5 wirelessly via the interface 6 of the capture unit 5. In particular, the vehicle information 3, in particular the registration number of the vehicle 1, can be recorded with a camera, in particular a portable computer or smartphone, and transmitted to the capture unit 5 as image information. In this case, the capture unit 5 is designed to extract the vehicle information 3 from the image information in particular by means of digital image processing.

Preferably, the vehicle information 3 is filed on an integrated circuit, in particular a microchip. The circuit is preferably part of the license plate and more preferably configured to send the vehicle information 3 to the capture unit 5 by radio signal. More preferably, the interface 6 of the capture unit 5 is configured to receive the vehicle information 3 sent by radio signal.

More preferably, the capture unit 5 is connected directly to a memory of the vehicle 1 and can read the vehicle information 3 directly from the memory of the vehicle 1.

The configuration of the capture unit 5 in the vehicle 1, in particular as part of the navigation unit 8, means that it is a particularly convenient and easy possibility to capture vehicle information 3 of the vehicle 1 in method step 101 and to send it to the management unit 2 in method step 102.

The vehicle information 3 of the vehicle 1 captured in or by the capture unit 5 in method step 101 is sent to the management unit 2 in method step 102 wirelessly, in particular via the navigation unit 8, together with a vehicle identification number, which may in particular be the registration number of the vehicle 1. This can be done in particular using a separate information signal 16, for example a GSM, UMTS or LTE radio signal, and/or a wireless Internet connection. The vehicle information 3 sent is then filed in the vehicle information memory 11 of the management device 2 in method step 103 and is available there for identifying traffic rules 4 referring to this vehicle information 3. Alternatively or additionally, the vehicle information 3, in particular with a vehicle identification number, captured by the capture unit can be sent to the management unit 2 with the request signal 10.

As a result, as explained in the second embodiment shown in FIG. 2 and in the associated text, a request signal 10 sent by the vehicle 1 or the navigation unit 8 in method step 104 can prompt traffic rules 4 referring to vehicle information 3 of the vehicle 1 sending the request to be identified and made available in step 105, and navigation information to be computed by the computation module 7 in method step 106 and sent by means of a response signal 12 to the vehicle 1 or the navigation unit 8 of the vehicle 1, where the navigation information is output by the navigation unit 8 in method step 107.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Vehicle
2 Management unit
3 Vehicle information
4 Traffic rules referring to vehicle information
5 Capture unit
6 Interface of the capture unit
7 Computation module
8 Navigation unit
9 Traffic rule memory
10 Request signal
11 Traffic rule memory
12 Response signal
13 First Internet connection
13' Second Internet connection
14 Connection
15 Interface of the navigation unit
16 Information signal
17 Device having Internet capability
100 Method for navigating a vehicle
101 Capture vehicle information
102 Send vehicle information to the management unit
103 Store vehicle information on the management unit
104 Send a request to the management unit
105 Identify traffic rules referring to vehicle information
106 Compute navigation information
107 Output navigation information

What is claimed is:

1. A system for navigating a vehicle, comprising:
    a management unit arranged outside the vehicle, the management unit being configured to centrally store vehicle information of the vehicle and traffic rules relevant to the vehicle;
    a capture unit having an interface configured to capture the vehicle information of the vehicle including at least one vehicle identification number, the capture unit being further configured to send the captured vehicle information of the vehicle to the management unit;
    a computation module configured to generate navigation information based on the stored traffic rules determined by the management unit to be relevant to the vehicle based on the captured vehicle information of the vehicle stored at the management unit; and
    a navigation unit arranged in the vehicle configured to output the navigation information generated by the computation module.

2. The system for navigating a vehicle as claimed in claim 1, wherein
    the navigation unit includes an interface configured to capture and store the vehicle identification number.

3. The system for navigating a vehicle as claimed in claim 2, wherein
    the navigation unit is configured to communicate via a communication link with the management unit and transmit at least the stored vehicle identification number for the vehicle to the management unit.

4. The system for navigating a vehicle as claimed in claim 3, wherein
    the management unit includes the computation module, and
    the navigation unit is configured to receive the navigation information computed by the computation module.

5. The system for navigating a vehicle as claimed in claim 3, wherein
    the navigation unit includes the computation module, and
    the navigation unit is configured to receive the traffic rules relevant to the vehicle stored by the management unit.

6. The system for navigating a vehicle as claimed in claim 1, wherein
    the capture unit is configured to capture a vehicle registration number as the vehicle identification number or to capture a vehicle registration number as vehicle information other than the vehicle identification number.

7. The system for navigating a vehicle as claimed in claim 6, wherein
    the capture unit is configured to capture at least one engine specification as at least a part of the vehicle information other than the vehicle identification number.

8. The system for navigating a vehicle as claimed in claim 7, wherein
    an interface of the capture unit is configured as an input mask of an Internet portal.

9. The system for navigating a vehicle as claimed in claim 1, wherein
    the capture unit is part of the navigation unit.

10. A method for navigating a vehicle, comprising the acts of:
    capturing vehicle information of the vehicle with a capture unit;
    sending the captured vehicle information of the vehicle to a management unit containing stored traffic rules relevant to the vehicle;

storing the captured vehicle information of the vehicle on the management unit;

generating navigation information with a computation module based on the stored traffic rules determined by the management unit to be relevant to the vehicle based on the vehicle information of the vehicle sent to the management unit; and outputting the navigation information generated by the computation module by a navigation unit in the vehicle.

11. The method for navigating a vehicle as claimed in claim 10, wherein the vehicle information includes a vehicle identification number.

12. The method for navigating a vehicle as claimed in claim 11, wherein the management unit includes the computation module, the navigation unit in the vehicle sends to the management unit a request signal to generate and send the navigation information based on the traffic rules relevant to the vehicle and the vehicle information of the vehicle, in response to the request signal, the computation module generates the navigation information based on the traffic rules relevant to the vehicle and the vehicle information of the vehicle, and the management unit sends the navigation information generated by the computation module to the navigation unit.

13. The method for navigating a vehicle as claimed in claim 12, wherein the navigation unit sends an identification number of the vehicle with the request signal, the management unit identifies the traffic rules relevant to the vehicle on the basis of the vehicle identification number and sends the traffic rules relevant to the vehicle to the computation unit, and the management unit sends the generated navigation information to the navigation unit.

14. The method as claimed in claim 13, wherein current traffic rules relevant to the vehicle are at least one of stored and updated on the management unit.

15. The method for navigating a vehicle as claimed in claim 11, wherein the navigation unit includes the computation module, the navigation unit in the vehicle sends to the management unit a request signal for the management unit to send the traffic rules relevant to the vehicle stored on the management unit to the navigation unit, in response to the request signal, the management unit sends the traffic rules relevant to the vehicle to the navigation unit, and the computation module of the navigation unit generates the navigation information based on the received traffic rules relevant to the vehicle and the vehicle information of the vehicle.

16. The method for navigating a vehicle as claimed in claim 15, wherein the navigation unit sends an identification number of the vehicle with the request signal, the management unit identifies the traffic rules relevant to the vehicle on the basis of the vehicle identification number, and the management unit sends said traffic rules relevant to the vehicle to the navigation unit.

17. The method as claimed in claim 16, wherein current traffic rules relevant to the vehicle are at least one of stored and updated on the management unit.

18. A vehicle, comprising a system for navigation, the navigation system including a management unit arranged outside the vehicle, the management unit being configured to centrally store vehicle information of the vehicle and traffic rules relevant to the vehicle;

a capture unit having an interface configured to capture the vehicle information of the vehicle including at least one vehicle identification number, the capture unit being further configured to send the captured vehicle information of the vehicle to the management unit;

a computation module configured to generate navigation information based on the stored traffic rules determined by the management unit to be relevant to the vehicle based on the captured vehicle information of the vehicle stored at the management unit; and a navigation unit arranged in the vehicle configured to output the navigation information generated by the computation module.

* * * * *